United States Patent [19]
Ichikawa et al.

[11] Patent Number: 5,412,633
[45] Date of Patent: May 2, 1995

[54] OPTICAL DISK APPARATUS WITH GALVANOMIRROR HAVING MOVABLE REFLECTING SURFACES COOPERATING WITH FIXED REFLECTING SURFACES

[75] Inventors: Atsushi Ichikawa, Tsukuba; Yoshiaki Yamauchi, Ibaraki; Akira Saito, Odawara, all of Japan

[73] Assignee: Hitachi, Ltd., Tokyo, Japan

[21] Appl. No.: 164,785

[22] Filed: Dec. 10, 1993

Related U.S. Application Data

[63] Continuation of Ser. No. 765,978, Sep. 26, 1991, abandoned.

[30] Foreign Application Priority Data

Sep. 26, 1990 [JP] Japan .................................. 2-256095

[51] Int. Cl.$^6$ ................................................ G11B 7/00
[52] U.S. Cl. ................................... 369/44.14; 369/112
[58] Field of Search .............. 369/44.14, 44.21, 44.17, 369/44.11, 112, 119, 110, 44.23, 44.15, 44.16, 44.18–44.20; 359/831, 834, 837; 348/202, 203, 205

[56] References Cited

U.S. PATENT DOCUMENTS

| | | | |
|---|---|---|---|
| 3,871,750 | 3/1975 | Mecklenborg | 358/834 |
| 3,978,278 | 8/1976 | Bouwhuis et al. | 369/112 |
| 4,793,672 | 12/1988 | McGrath, Jr. | 359/834 X |
| 5,140,572 | 8/1992 | Kibune et al. | 369/44.17 X |

FOREIGN PATENT DOCUMENTS 0310304  12/1989  Japan .................................. 359/834

OTHER PUBLICATIONS

Reports of the Spring National Meeting of the Society of Electronic Information Communication, 1990, vol. 4, p. 474.

Primary Examiner—Aristotelis Psitos
Assistant Examiner—Thang V. Tran
Attorney, Agent, or Firm—Antonelli, Terry Stout & Kraus

[57] ABSTRACT

An optical disk unit has an optical system which is separated into a movable head assembly and a fixed optical system so that the movable head is made light weight. The movable head has an objective lens, an objective lens driving unit for focusing the objective lens, and a head moving unit for moving the whole movable head in the radial direction of an optical disk. The fixed optical system has a galvanomirror for deflecting the light emitted from a laser beam source and causing it to fall on the objective lens of the movable head, and detectors for receiving the light of the optical spot formed by the objective lens which is reflected from the optical disk. The galvanomirror is provided with a first mirror for reflecting the light emitted from the beam source to a plane intersecting the rotational shaft at right angles and directing the light to a fixed mirror, and a second mirror for deflecting the light reflected from the fixed mirror and directing the light to the objective lens. As a result, when the galvanomirror is rotated, the light reflected from the second mirror is constantly passed through a portion near the focal point of the objective lens of the light source side and falls on the objective lens.

12 Claims, 7 Drawing Sheets

OPTICAL DISK APPARATUS WITH GALVANOMIRROR HAVING MOVABLE REFLECTING SURFACES COOPERATING WITH FIXED REFLECTING SURFACES

This application is a continuation of Ser. No. 07/765,978, filed Sep. 26, 1991, now abandoned.

BACKGROUND OF THE INVENTION

1. Field of the Invention

The present invention relates to an optical disk apparatus having a mechanism for positioning an optical spot on an optical disk, and particularly to an optical disk apparatus having a separated optical system in which an objective lens and a focusing mechanism only are moved for access.

2. Description of Related Art

Although conventional optical disk apparatus having a separated optical system include various types, an optical disk apparatus of the type in which an objective lens and a focusing mechanism are mounted on an access mechanism is most light weight. An example of this type is the optical disk apparatus described in Reports of the Spring National Meeting of the Society of Electronic Information Communication in 1990, Volume 4, p. 474. In this apparatus, a galvanomirror is provided in a fixed optical system, and an optical spot is roughly positioned in the radial direction of a disk by moving an objective lens mounted on an access mechanism and is highly precisely positioned by rotating the galvanomirror through an angle corresponding to a differential amplitude of a high-frequency wave. There is no problem when the galvanomirror and the objective lens are placed at a short distance. However, when the objective lens is moved toward the inner periphery of the disk to increase a distance between the galvanomirror and the objective lens, if the galvanomirror is inclined from a neutral position (reference position), the following two problems are raised. A first problem is that, since the flux of light incident upon an objective lens is shifted from the optical axis of the objective lens, the diameter of the flux must be sufficiently increased so as to prevent the flux of light incident upon the objective lens from missing (changing in the sectional area of the flux). The intensity of the flux of light incident upon the objective lens is thus decreased. A second problem is that the position of the flux of light reflected from the disk and returned to the fixed optical system is deviated from the position of the flux of light incident upon the objective lens. In a differential diffraction system which is widely used as a track detecting system for detecting a relative positional deviation between an optical spot and a recording track on a disk, the above-described positional deviation of the flux of light returned to the fixed optical system produces an offset of a detection signal of the positional deviation between the optical spot and the recording track. A method has been thus proposed for decreasing the positional deviation of the flux of returned light, which is caused when the distance between the galvanomirror and the objective lens is increased. This method is disclosed in Japanese Patent Publication No. 58-6211. According to this publication, the rotational center of a galvanomirror is deviated from the center of the galvanomirror in correspondence with the distance between the center of the galvanomirror and the objective lens. However, this method has the problems that the response of the galvanomirror is deteriorated, and it is impossible to follow a positional deviation of a high frequency wave. If the distance between the rotational center and the center of the galvanomirror is increased due to an increase in the distance between the objective lens and the galvanomirror, the rigidity of a galvanomirror actuator is decreased and a moment of inertia is increased. These are the reasons why such problems are occurred.

Although the conventional optical disk apparatuses have the effect of decreasing a positional deviation of the optical axis of the flux of light reflected and returned from the disk, the disk apparatuses have the problem that high response required for a galvanomirror cannot be realized.

SUMMARY OF THE INVENTION

It is an object of the present invention to provide an optical disk apparatus which can restrain a positional deviation in the optical axis of the flux of light reflected and returned from a disk even when the distance between an objective lens and a galvanomirror is increased, and which enables the realization of high response of a galvanomirror.

In order to achieve the object, an optical disk apparatus according to the present invention comprises a spindle motor for rotating a disk-like medium having a data recording surface; a movable head assembly comprising an objective lens disposed opposite to the data recording surface, means for moving the objective lens in the normal direction of the medium and means for moving the objective lens in the radial direction of the medium; a fixed optical system comprising a laser beam source, a galvanomirror for deflecting the flux of incident light emitted from the laser beam source and radially reflecting the flux, and detectors for detecting a deviation of the optical spot obtained by the objective lens from the data recording surface and information recorded on the data recording surface; and two reflecting surfaces provided on the galvanomirror, which swing on a plane perpendicular to the rotational axis through the rotational axis in the direction of the flux of incident light, a first reflecting surface thereof reflecting the flux of incident light to the plane and reflects the flux to at least one fixed reflecting surface and a second reflecting surface reflecting the flux of reflected light incident from the fixed reflecting surface to the plane so that the flux is directed to the objective lens.

The galvanomirror may comprise a movable portion to which the first and second reflecting surfaces are bonded and which is supported by a rotational shaft having a center line on which the center of gravity of the movable portion is placed, a magnetic member secured to the movable portion or the fixed side and a magnet secured to a portion of the fixed side or the movable portion, which is opposite to the magnetic member.

Other objects and features of the present invention are made apparent from the following description of the preferred embodiments.

DESCRIPTION OF PREFERRED EMBODIMENTS

Figure 1:
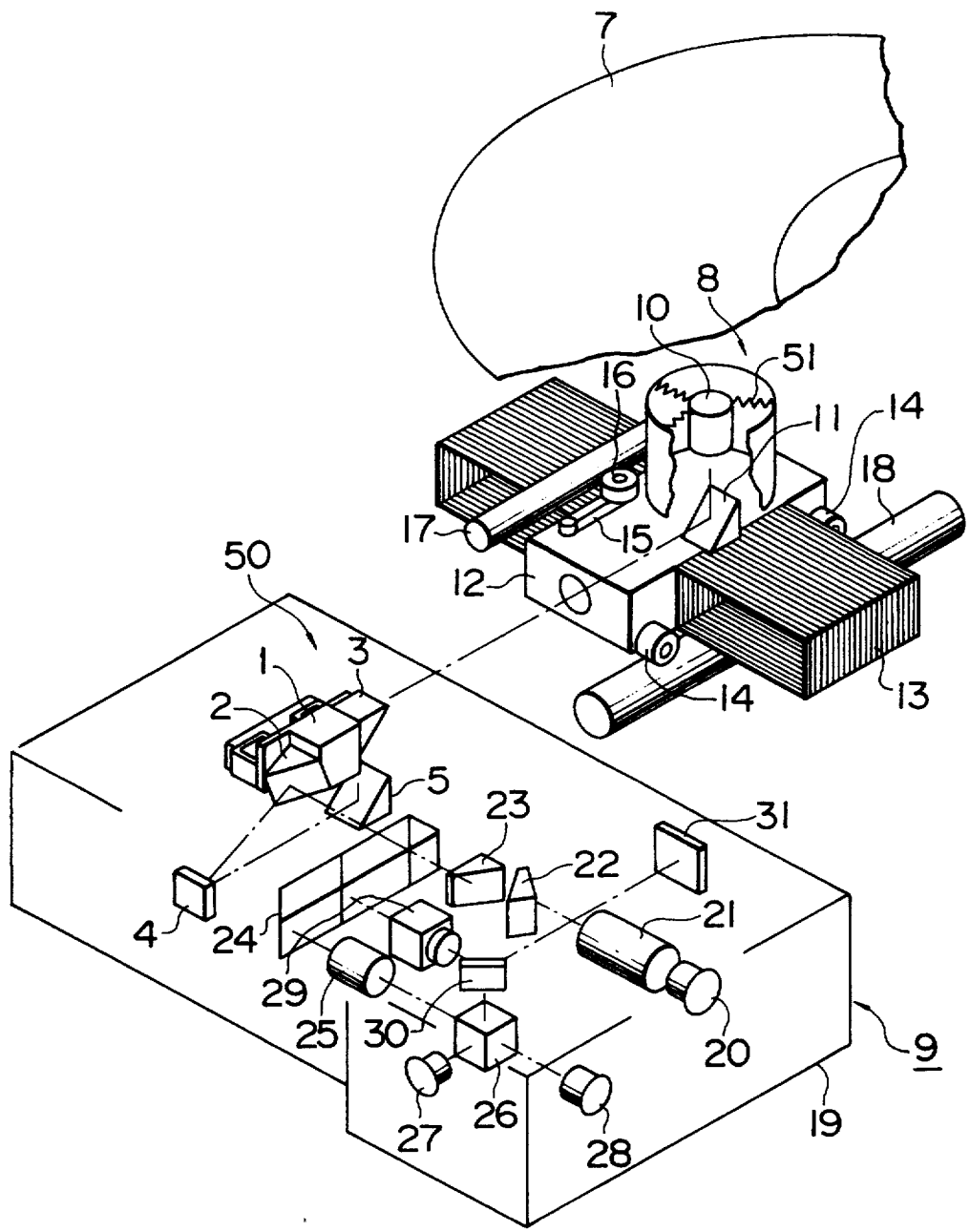
FIG. 1 shows an arrangement of an embodiment of the present invention.

Referring to FIG. 1, a movable head 8 is provided opposite to a disk 7 which is rotated at a predetermined speed by a spindle motor (not shown) and which has a recording surface for recording data on a spiral track thereon. An objective lens 10 is supported on a top of a body 12 of the movable head 8 through metal springs 51. The metal spring 51 has a low rigidity in the normal direction of the disk 7 and a high rigidity in the other directions, so that positioning control and data writing and reading are not adversely affected by vibrations. A standing mirror 11 is fixed in the body 12 so as to reflect the flux of incident light emitted from a fixed optical system 9 and direct the flux to the objective lens 10. The body 12 also has two head driving coils (head driving means) 13 which are respectively provided on each side thereof so that the movable head 8 can be moved in the radial direction of the disk 7 in combination with a magnetic circuit (not shown). The body 12 further has five ball bearings which are respectively mounted thereto through projection columns. The outer races of four bearings 14 of the five ball bearings contact with a main guide shaft 18 so as to have a function to guide the movable head 8 toward the center of the disk 7 with high precision and low friction. The remaining ball bearing contacts with a sub-guide shaft 17 so as to restrict the rotation of the movable head 8 around the main guide Shaft 18. A sixth ball bearing 16 is provided on a spring 15 so as to be urged against the sub-guide shaft 17 by the spring force of the spring 15.

Figure 2:
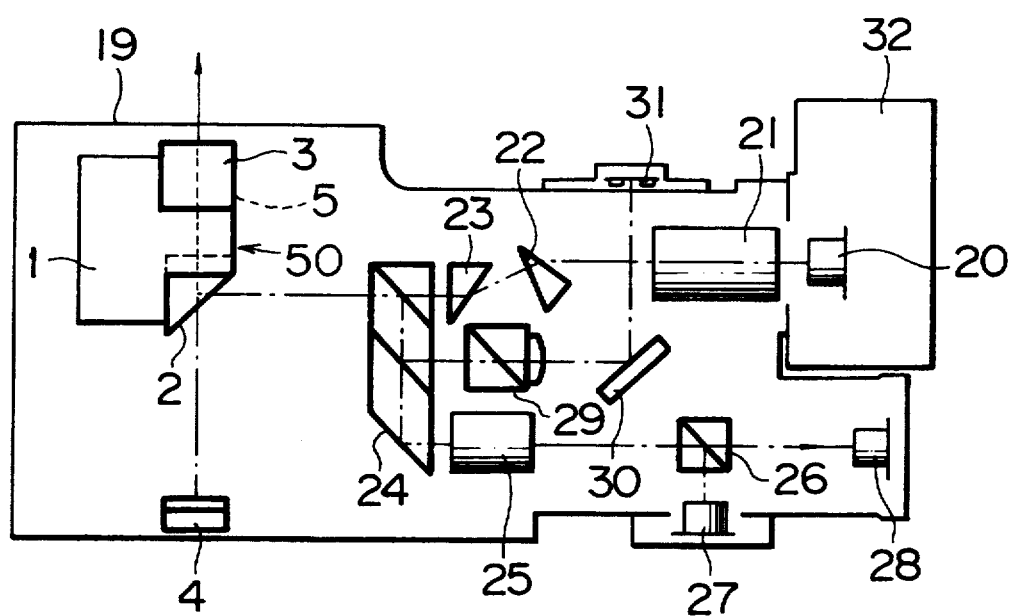
FIG. 2 is a plan view of the arrangement shown in FIG. 1.
Figure 3:
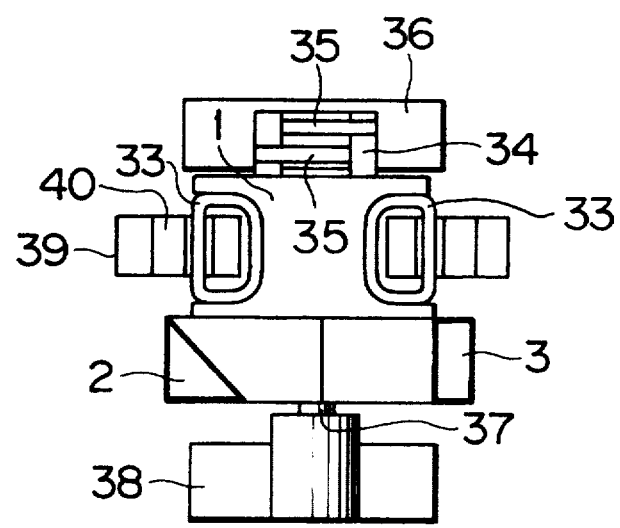
FIG. 3 is a plan view of a principal portion of the configuration shown in FIG. 1.
Figure 4:
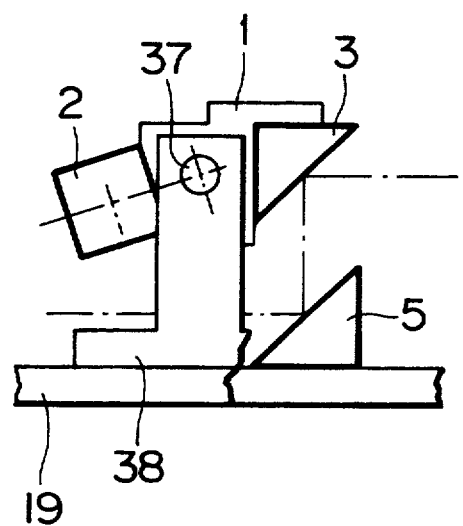
FIG. 4 is a front view of the principal portion shown in FIG. 3.
Figure 5:
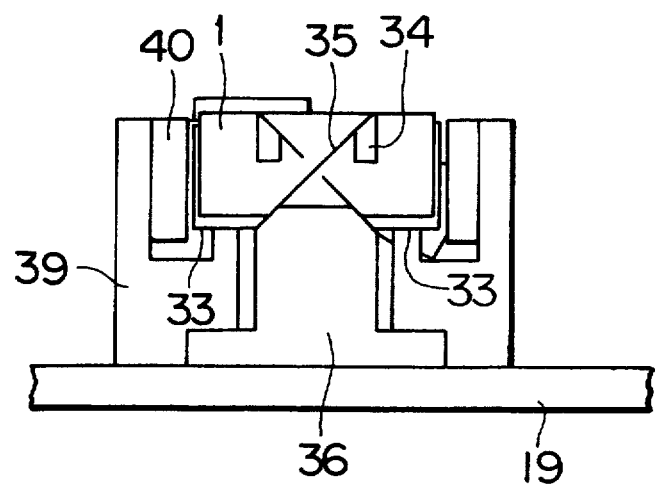
FIG. 5 is a rear side view of the principal portion shown in FIG. 3.
Figure 6:
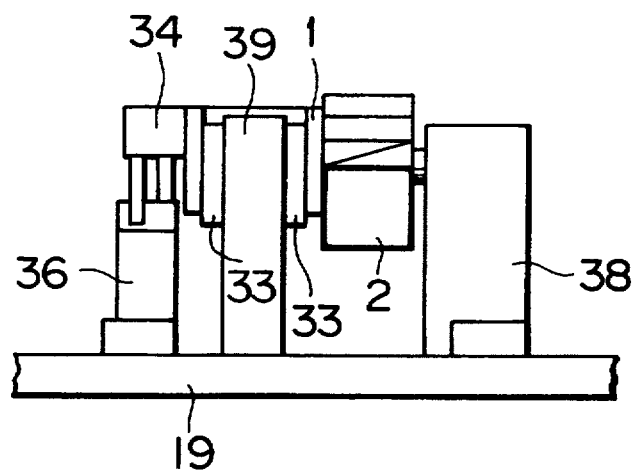
FIG. 6 is a left side view of the principal portion shown in FIG. 3.

In the fixed optical system 9, as shown in FIGS. 1 and 2, a laser 20, optical detectors 27, 28, 31 and optical system parts are fixed on a base 19. A box 32 shown in FIG. 2 serves as a high-frequency module for high-frequency modulation of the laser 20 so as to decrease the noise caused by the laser 20. The flux of incident light emitted from the semiconductor laser (laser beam source) 20 is made parallel by a collimator lens 21 and passes through prisms 22 and 23 so as to be widened in the direction parallel to the base 19. Although the flux of incident light emitted from the semiconductor laser 20 has an elliptic sectional form in which the width in the direction vertical to the base 19 is greater than that in the direction parallel with the base 19, the flux of light passed through the prisms 22 and 23 has a circular sectional form. The flux of incident light passes through a half mirror portion of a compound prism 24 and is vertically reflected by a first reflecting surface of a galvanomirror 50, for example, a first mirror 2. The flux is further reflected by fixed mirrors 4 and 5 and then by a second reflecting surface of the galvanomirror 50, for example, a second mirror 3, and directed to the standing mirror 11 of the movable head 8. The centers of the first and the second mirrors 2 and 3 of the galvanomirror 50 and the fixed mirrors 4 and 5 are placed on the same plane vertical to the rotational axis of the galvanomirror 50. The second mirror 3 and the fixed mirrors 4 and 5 intersect the same plane at right angles.

The flux of incident light is reflected by the standing mirror 11 in the movable head 8 and narrowed by the objective lens 10 to form a small optical spot having a diameter of about 1.6 $\mu$m on the recording surface of the disk 7. The flux of light is reflected back from the recording surface and passes through the objective lens 10 so as to be made parallel. The flux of reflected light passes through the second mirror 3, the fixed mirror 5, the fixed mirror 4 and the first mirror 2 and is reflected by the half mirror of the compound prism 24. The reflected light is separated into light towards a Wollaston prism 29 and light passing through the compound prism 24 by the half mirror provided at the center of the compound prism 24. In the Wollaston prism 29, the light is separated into a normal light ray and an abnormal light ray. They are converged by the lens provided on one end surface of the Wollaston prism 29, and changed in direction by a reflecting mirror 30 towards a signal detector 31. Spots of the normal and the abnormal light rays are formed on the respective optical detecting portions on the signal detector 31. On the basis of the difference between the detection signals of the normal and the abnormal light rays, the signal detector circuit detects the data recorded as a photoelectromagnetic signal magnetized in an upward or a downward direction on the recording surface of the disk 7.

On the other hand, the light from the compound prisms 24 is reflected by a total reflection portion provided at the other end of the compound prism 24 so as to pass through a lens 25 to be converged. The convergent light is separated into reflected light and passed light by a half prism 26. The reflected light enters a servo signal detector 27 provided short of the focal point of the convergent light, and the passed light falls on a servo signal detector 28 provide behind the focal point of the convergent light.

The data is recorded on the recording surface of the disk 7 along a guide groove having a depth of about 0.1 $\mu$m and a width of about 0.5 $\mu$m. A deviation (track deviation) of the optical spot from the guide groove and a focal deviation of the optical spot are detected by the servo signal detectors 27 and 28 of the fixed optical system 9. The objective lens 10 is driven by a focusing actuator (objective lens driving means) (not shown) in the normal direction of the disk 7 so that the focal deviation is decreased. The galvanomirror 50 is driven so as to decrease the track deviation, as described below. The optical spot is caused to track a displacement with a low frequency and a high amplitude in the guide groove on the disk 7 by moving the movable head 8 by means of the head driving coils 13, and other displacement with a high frequency and a low amplitude by rotating the galvanomirror 50. An allocation of the tracking by the movable head 8 and the tracking by the galvanomirror 50 is determined by a track following circuit. Such allocation system is disclosed, for example, in Japanese Patent Unexamined Publication No. 61-3332.

Each of the servo signal detectors 27, 28 has a band-shaped track deviation detecting portion which is longitudinally formed at the center thereof and which is longitudinally divided into upper and lower parts so that an unbalance of the optical spot light diffracted by the guide groove is detected as an output difference between the upper and lower parts and fed back as a track deviation signal. Focal deviation detection portions are provided on transverse sides of the track deviation detecting portion so as to detect a focal deviation as an output difference between the focal deviation detection portions of the servo signal detectors 27 and 28. An example of such detection methods is disclosed in Japanese Patent Unexamined Publication No. 64-64127.

The function of the two-mirror type galvanomirror 50 will be described hereinunder with referring to FIGS. 3 to 6.

The two-mirror type galvanomirror 50 has the first and the second mirrors 2 and 3, both of which are joined to a mirror holder 1. The first mirror 2 reflects light by employing total reflection in the glass, and the second mirror 3 reflects light from the surface thereof. Two driving coils 33 are mounted on the mirror holder 1 and pivotally mounted by a supporting pin (rotational axis) 37. Two plate springs 35 are bonded in a crossed form to a junction portion 34 projected from the mirror holder 1. The cross portion of the plate springs 35 is placed on an axis of the supporting pin 37, and the center of gravity of the movable portion of the galvanomirror 50 is also placed on the axis of the supporting pin 37. The movable portion includes the mirror holder 1, the spring junction portion 34, the driving coils 33, the first and the second mirrors 2 and 3, and the supporting pin 37. One of the main inertia axes of the movable portion of the galvanomirror 50 coincides with the axis of the supporting pin 37. In this embodiment, each of the members is replaced by a plate intersecting at right angles the axis of the supporting pin 37, and the shape and material of each member are determined so that the center of gravity of the plate coincides with the axis of the supporting pin 37.

The fixed portion of the two-mirror type galvanomirror 50 comprises a pin holder 38 for the supporting pin 7, a spring holder 36 for securing and supporting the plate springs 35, and a magnet 40 and a driving yoke, both of which cooperate with the driving coils 33 to form a driving portion. A linear portion of the driving coil 33 is inserted into a magnetic gap portion defined between the magnet 40 and the center pole of the yoke 39. The driving coils 33 generate forces vertical to the sheet of FIG. 3 when a current is supplied in the direction vertical to the magnetic field. The coils 33 generate force in the opposite directions so as to generate angular moment. Each of the members of the fixed portion is secured to the base 19 by using a screw (not shown).

In this embodiment, the movable head 8 is moved for about 30 mm between the innermost periphery and the outermost periphery of the disk 7. In this embodiment, the length $l_0$ of the optical path from the first mirror 2 to the second mirror 3 is determined in accordance with the focal point on the light source side of the objective lens at a reference position which is set at the center between the innermost periphery and the outermost periphery of the disk 7. As a result, the flux of light incident upon the objective lens 10 falls on a point on the optical axis deviated by 15 mm from the focal point of the light source side in the innermost or the outermost periphery of the disk 7. However, such a degree of deviation produces a positional deviation of 90 μm of the optical axis of the flux returned to the fixed optical system 9 when the galvanomirror 50 is inclined at an angle of 3 mrad and then an offset in the track deviation signal is only about 0.05 μm. This is a half of 0.1 μm which is generally-known tracking positional error and is thus allowable. This error corresponds to a displacement of 12 μm of the optical spot if the focal distance of the objective lens is 4 mm when the galvanomirror 50 is rotated through an angle of 3 mrad. However, it is easy to keep a displacement at a level of 12 μm or less, which is caused by tracking by the galvanomirror 50, by increasing the ratio of tracking by the movable head 8.

Figure 7:
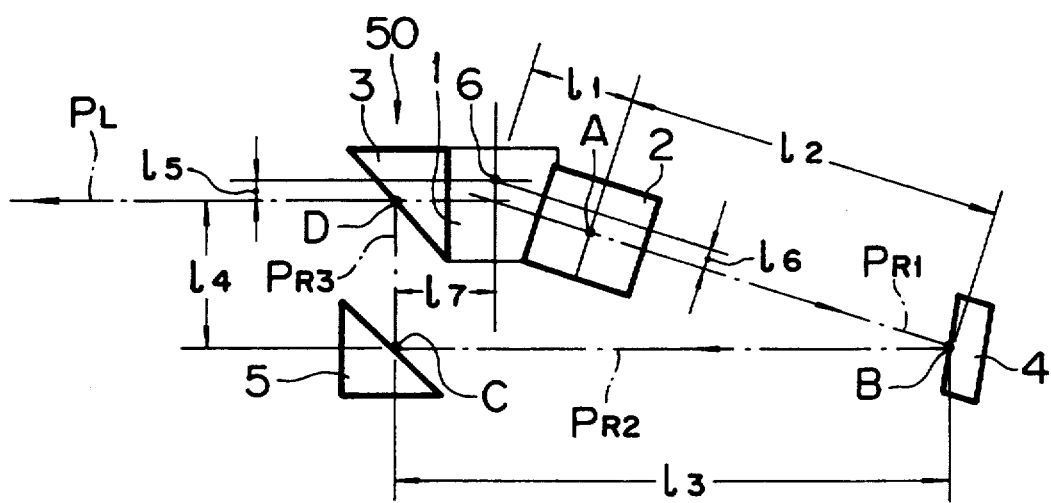
FIGS. 7 to 9 explain the function of the embodiment.
Figure 8:
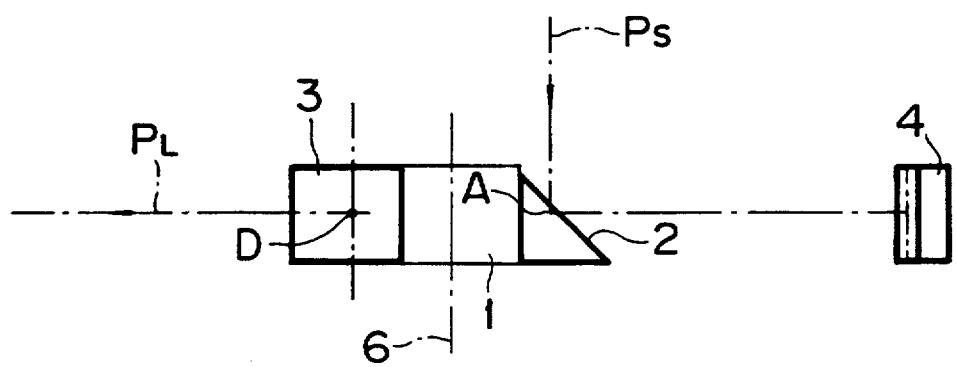
Figure 9:
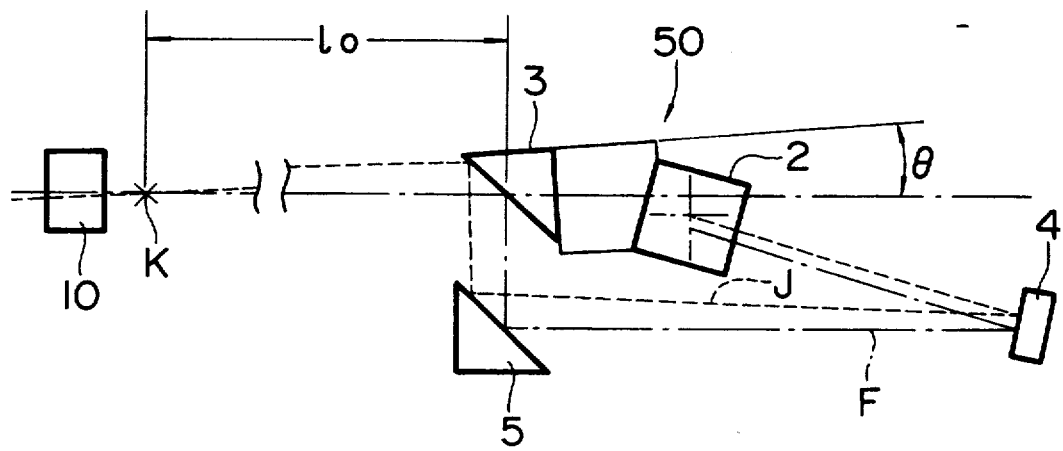

The conditions of the optical system in this embodiment are as follows. Referring to FIGS. 7 to 9, when the mirror holder 1 of the galvanomirror 50 is rotated through a small angle $\theta$ around the rotational axis 6, since the first mirror (first reflecting surface) 2 of the galvanomirror 50 is also rotated through the angle $\theta$, the direction of incidence of the flux $P_s$ of light emitted from the light source is rotated through the angle $\theta$ in the plane vertical to the rotational axis 6. The reflected light is reflected by the fixed mirrors 4 and 5 and falls on the second mirror (second reflecting surface) 3 of the galvanomirror 50. Since the second mirror 3 and the flux of light incident upon the second mirror 3 are rotated through the angle of $\theta$, the flux $P_L$ reflected from the second mirror 3 is also rotated through the angle $\theta$ (shown by a broken line J in FIG. 9.)

It is assumed that the distance between the rotational axis 6 and the intersection A between the first mirror and the center of the flux $P_s$ of incident light in the direction of the flux $P_{R1}$ of reflected light is $l_1$, the distance between the intersection A and the center of the fixed mirror 4 is $l_2$, the flux of reflected light after the flux $P_{R1}$ of reflected light is reflected by the fixed mirror 4 is $P_{R2}$, and the flux of reflected light after the flux $P_{R2}$ of reflected light is reflected by the fixed mirror 5 is $P_{R3}$. Assuming that if the intersection between the flux $P_{R1}$ of reflected light and the fixed mirror 4 is B, the intersection between the flux $P_{R2}$ of reflected light and the fixed mirror 5 is C, the intersection between the flux $P_{R3}$ of reflected light and the second mirror 3 of the galvanomirror 50 is D, the distance between the intersections B and C is $l_3$, the distance between the intersections C and D is $l_4$, the distance between the flux $P_r$ and the rotational axis 6 is $l_5$, the distance between the flux $P_{R1}$ of reflected light and the rotational axis 6 is $l_6$, and the distance between the intersection D and the rotational axis 6 in the direction of the flux $P_r$ of emitted light is $l_7$, the origin D of the flux $P_r$ of emitted light is displaced by a distance $\delta_s$ from the optical axis of the flux $P_r$ of emitted light in the neutral state in the direction vertical to the optical axis in the plane vertical to the rotational axis 6. The distance $\delta_s$ is expressed by the following equation (1):

$$\delta_s = (l_2 + l_3 + l_4 + l_5 - l_7) \times \theta \tag{1}$$

Since the origin of the flux of emitted light is deviated by $\delta_s$, and the flux is inclined by the angle $\theta$, it intersects the neutral optical axis at a point at a distance $l_0$ from the position D, which distance is expressed by the following equation (2):

$$l_0 = l_2 + l_3 + l_4 + l_5 - l_7 \tag{2}$$

Namely, when the position at the distance $l_0$ from the point D is set at the focal point K of the second mirror 3 and the objective lens 10 on the light source side, even if the galvanomirror 50 is rotated, since the flux of light emitted from the galvanomirror 50 passes through the focal point K of the objective lens on the light source side, the flux of light reflected and returned from the disk also passes through the same path, without producing any positional deviation. In addition, since the flux of emitted light incident upon the objective lens also passes through the focal point K on the light source side, the flux of light is hardly missed and can be effectively employed. It is a matter of course that each of the fluxes of light must not be deviated from the effective portion of each mirror, and it is desirable that the distance $l_6$ in FIG. 7 is zero. This is because if the distance $l_6$ is a finite value, since the rotation of the galvanomirror 50 deviates the reflection position of the flux of light emitted from the light source by $l_6 \times \theta$ from the neutral reflection position in the direction AB, the reflection position is deviated in the direction of the rotational axis, resulting in the undesirable phenomenon that the flux of reflected light is moved parallel in the direction of the optical axis.

Figure 10:
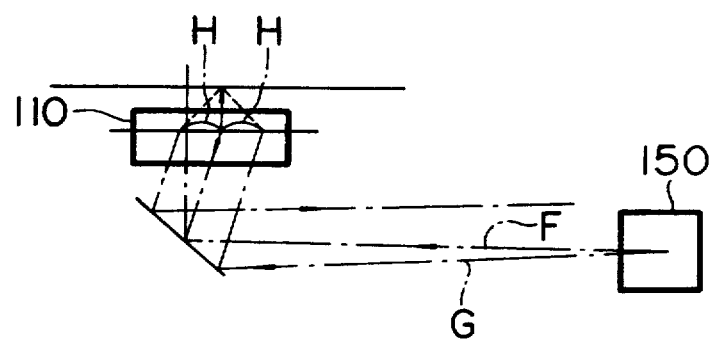
FIG. 10 explains a conventional apparatus.

In the conventional system, as shown in FIG. 10, if the galvanomirror 150 is inclined from a neutral position (reference position) F, the flux of light incident upon an objective lens 110 is shifted by H from the optical axis G of the objective lens.

Figure 11:
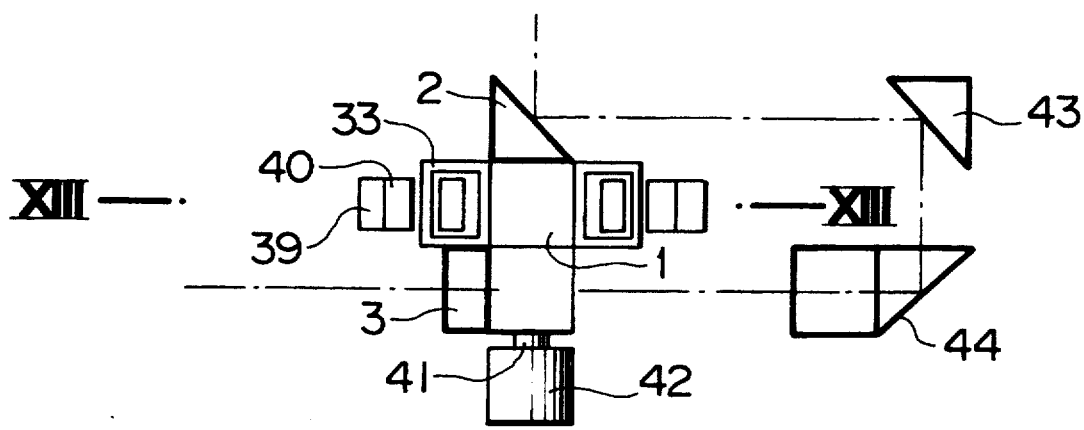
FIG. 11 shows an arrangement of another embodiment of the present invention.
Figure 12:
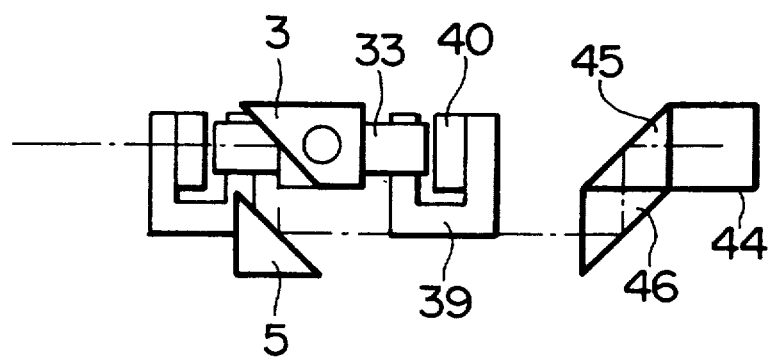
FIG. 12 is a front view of the arrangement shown in FIG. 11.
Figure 13:
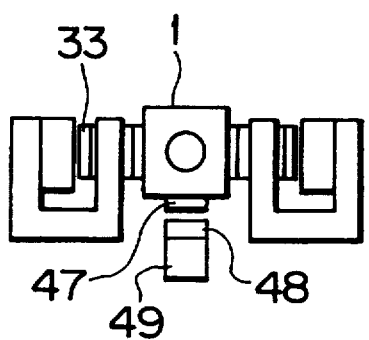
FIG. 13 is a sectional view taken along the lines XIII—XIII in FIG. 11.

A galvanomirror 50 in a disk apparatus according to a second embodiment is described below with reference to FIGS. 11 to 13.

First and second mirrors 2 and 3 are coaxially disposed on the rotational axis so that the moment of inertia in the rotational direction is decreased and the responsibility is increased. In this embodiment, since the flux of light reflected from the first mirror 2 and the flux of light reflected from the second mirror 3 are not in the same plane, a fixed mirror 43 is provided at an inclination angle of 45° with respect to the direction of the flux for the purpose of moving the flux of light in the direction of the rotational axis. In the second embodiment, a parallel mirror portion inclined at 45° with respect to the flux of incident light composed of prisms 45 and 46 is disposed for the purpose of downwardly directing the flux of light reflected from the first mirror 2 to a position at the same height as that of the fixed mirror 5 located below the second mirror 3. However, in case that the first mirror is so obliquely disposed that light is downwardly reflected at an angle and the fixed mirrors 43 and 44 are so disposed that they are slightly inclined from each other, as in the first embodiment, the prisms 45 and 46 can be omitted.

In the second embodiment, it is difficult to support the movable portion on the both sides thereof on the central axis, particularly, on the light source side. A pin holder 42 is provided with a supporting pin (rotational shaft) 41 having a circular sectional form, which is projected therefrom and inserted into an elongated hole provided in the movable portion so as to support it. An iron piece 47 provided on the lower portion of a mirror holder 1 is attracted by a magnet 48 which is provided on a magnetic holder 49 provided on an optical system base (not shown) so as to set a neutral position and prevent loosening of the movable portion provided integrally with the mirror holder 1. The driving portion comprises a double magnetic circuit having the two driving coils 33 which are attached to the mirror holder 1, and magnets 40 and yokes 39, like the first embodiment.

The present invention provides an optical disk apparatus having a separated optical system comprising a movable head having only a focusing actuator and a fixed optical system having a small tracking galvanomirror having two mirrors which are integrally rotated, in which a flux of light can be reflected by using the galvanomirror to the focal point on the light source side of an objective lens placed at a distance of several tens mm from the galvanomirror, and the positional deviation of the flux of light returned from the objective lens can be significantly decreased. The present invention thus enables a significant increase in the accuracy of tracking. As a result, it is possible to produce a separated optical system disk having a light movable portion and significantly decrease the access time.

What is claimed is:

1. An optical disk apparatus comprising:
   a spindle motor for rotating a disk-shaped medium having a data recording surface;
   a movable head assembly having an objective lens provided opposite to said data recording surface, means for moving said objective lens in a direction normal to said disk recording surface of said medium, and means for moving said objective lens along a predetermined length in a radial direction of said medium;
   a fixed optical system having a laser beam source, a galvanomirror for deflecting a flux of light emitted from said laser beam source and incident thereon so as to reflect said flux of incident light in said radial direction; and
   two movable reflecting surfaces provided on said galvanomirror, which galvanomirror has a rotational axis in a direction of said flux of incident light and being selectively rotatable on a plane intersecting said rotational axis at right angles to change an angle of each of said two movable reflecting surfaces with respect to said flux of incident light, a first movable reflecting surface of said two movable reflecting surfaces reflecting said flux of incident light to said plane and to plural fixed reflecting surfaces on said plane, said plural fixed reflecting surfaces intersecting said plane at fight angles, and a second movable reflecting surface of said two reflecting surfaces directing the flux of incident light reflected from said plural fixed reflecting surfaces to said plane and to cause said directed flux of incident light to be directed in a radial direction of said medium, an arrangement of said first and second movable reflecting surfaces and said plural fixed reflecting surfaces being mutually cooperative with one another with respect to angular reflections of said flux of incident light so as to direct said flux of light substantially through a predetermined focal point referenced to said objective lens, when said galvanomirror is selectively rotated.

2. An optical disk apparatus according to claim 1, wherein said galvanomirror has a movable portion to which said first and second movable reflecting surfaces are bonded is supported by a rotational shaft having a center line on which the center of gravity of said movable portion is placed, and wherein driving coils are fixed to said movable portion or a fixed side and a magnet is secured to said fixed side on said movable portion opposite to said driving coils.

3. An optical disk apparatus according to claim 1, wherein said galvanomirror is rotatable for a predetermined angular range, and said arrangement directs said flux of light substantially through said predetermined focal point for all angular positions of galvanomirror within said predetermined angular range.

4. An optical disk apparatus comprising:
a disk-shaped medium to be rotated by a spindle motor and having a data recording surface;
a movable head assembly having an objective lens provided opposite to said data recording surface, means for moving said objective lens in a direction normal to said data recording surface of said medium and means for moving said objective lens along a predetermined length in a radial direction of said medium;
a fixed optical system having a laser beam source, a galvanomirror for deflecting a flux of light emitted from said laser beam source and incident thereon so as to reflect said flux of incident light in said radial direction;
two fixed mirrors provided in said fixed optical system; and
first and second movable mirrors provided on said galvanomirror, which galvanomirror has a rotational axis in a direction of said flux of incident light and being selectively rotatable on a plane intersecting said rotational axis at right angles to change an angle of each of said first and second movable mirrors with respect to said flux of incident light, said first movable mirror reflecting said flux of incident light to a first fixed mirror of said two fixed mirrors, said first fixed mirror reflecting said flux of incident light from said first movable mirror to a second fixed mirror of said two fixed mirrors on said plane, said second fixed mirror reflecting said flux of incident light to said second movable mirror, and said second movable mirror directing said flux of incident light reflected from said second fixed mirror to said plane and to cause said flux of incident light to be directed in a radial direction of said medium, an arrangement of said first and second movable mirrors and said two fixed mirrors being mutually cooperative with one another with respect to angular reflections of said flux of incident light so as to direct said flux of light substantially through a predetermined focal point referenced to said objective lens when said galvanomirror is selectively rotated.

5. An optical disk apparatus according to claim 4, wherein the respective centers of said first and said second movable mirrors and said two fixed mirrors are placed on the same plane at right angles with respect to the rotational axis of said galvanomirror.

6. An optical disk apparatus according to claim 4, wherein said galvanomirror is rotatable for a predetermined angular range, and said arrangement directs said flux of light substantially through said predetermined focal point for all angular positions of said galvanomirror within said predetermined angular range.

7. An optical disk apparatus comprising:
a disk-shaped medium to be rotated by a spindle motor and having a data recording surface;
a movable head assembly having an objective lens provided opposite to said data recording surface, means for moving said objective lens in a direction normal to said data recording surface of said medium and means for moving said objective lens along a predetermined length in a radial direction of said medium;
an optical system having an arrangement of a plurality of fixed mirrors and a galvanomirror with at least first and second movable mirrors, said first movable mirror for receiving a flux of light produced by a laser source and directing a reflected flux of light to said plurality of fixed mirrors, said plurality of fixed mirrors directing said reflected flux of light to said second movable mirror, said galvanomirror with at least said first and second movable mirrors being selectively rotatable for a predetermined angular range to change an angle of each of said first and second movable mirrors with respect to said flux of light, said arrangement of said plurality of fixed mirrors and said galvanometer with at least said first and second movable mirrors directing light along a mutual plane and being mutually cooperative with one another with respect to angular reflections of said reflected flux of light so as to direct said flux of light substantially through a predetermined focal point referenced to said objective lens when said galvanomirror is selectively rotated.

8. An optical disk apparatus according to claim 7, wherein said arrangement directs said flux of light substantially through said predetermined focal point for all angular positions of said galvanomirror within said predetermined angular range.

9. An optical disk apparatus comprising:
a spindle motor for rotating a disk-shaped medium having a data recording surface;
a movable head assembly having an objective lens provided opposite to said data recording surface, a lens moving means for moving said objective lens in a direction normal to said disk recording surface of said medium, a reflecting means for reflecting an incident flux of light to said objective lens, and a head moving means for moving said movable head assembly in a radial direction of said medium between an innermost and outermost periphery of said medium;
a fixed optical system having a laser beam source, a galvanomirror for deflecting a flux of light emitted from said laser beam source and incident thereon so as to reflect said flux of incident light in said radial direction to said reflecting means, and detectors for detecting a deviation of an optical spot formed by said objective lens on said data recording surface;
two movable reflecting surfaces provided on said galvanomirror, which galvanomirror has a rotational axis in a direction of said flux of incident light from said laser beam source and is rotatable on a plane intersecting said rotational axis at right angles, a first movable reflecting surface of said two movable reflecting surfaces reflecting said flux of incident light from said laser beam source to said plane and to plural fixed reflecting surfaces, and a second movable reflecting surface of said two reflecting surfaces intersecting said plane at right angles and directing said flux of incident light reflected from said plural fixed reflecting surfaces to said reflecting means on said movable head assembly; and
a difference between an optical path between said first and second movable reflecting surfaces and a distance between said second movable reflecting surface and said rotating center of said galvanomirror being equivalent to an optical path between said second movable reflecting surface and a focal point of said objective lens on said movable head assembly at a center between said innermost and outermost periphery of said medium.

10. An optical disk apparatus according to claim 9, wherein said fixed reflecting surfaces comprise an even number of reflecting surfaces on said plane and which intersect said plane at right angles, and said fixed reflecting surfaces face a side of said galvanomirror.

11. An optical disk apparatus according to claim 9, wherein said galvanomirror has a movable portion to which said first and second movable reflecting surfaces are bonded and is supported by a rotational shaft having a center line on which the center of gravity of said movable portion is placed, and wherein an arrangement of driving coils and a magnet are fixed to opposite ones of said movable portion and a fixed portion of said apparatus.

12. An optical disk apparatus comprising:
a disk-shaped medium rotated by a spindle motor and having a data recording surface;
a movable head assembly having an objective lens provided opposite to said data recording surface, a lens moving means for moving said objective lens in a direction normal to said data recording surface, a reflecting means for reflecting an incident flux of light from a fixed optical system to said objective lens, and a head moving means for moving said movable head assembly in a radial direction of said disk-shaped medium between innermost and outermost peripheries of said disk-shaped medium;
a fixed optical system having a laser beam source, a galvanomirror for deflecting a flux of light emitted from said laser beam source and incident thereon so as to reflect said flux of incident light in said radial direction to said reflecting means, and detectors for detecting a deviation of an optical spot formed by said objective lens on said data recording surface;
two fixed mirrors provided in said fixed optical system;
a first movable mirror and a second movable mirror provided on said galvanomirror, which galvanomirror has a rotational axis in a direction of said flux of incident light from said laser beam source and is rotatable on a plane intersecting said rotational axis at fight angles, said first movable mirror reflecting said flux of incident light from said laser beam source to a first fixed mirror of said two fixed mirrors on said plane and intersecting said plane at right angles, said first fixed mirror being disposed nearer to said first movable mirror than said second movable mirror and reflecting said flux of incident light from said first movable mirror to a second fixed mirror of said two fixed mirrors on said plane, said second fixed mirror being disposed nearer to said second movable mirror and reflecting said flux of incident light from said first fixed mirror to said second movable mirror, and said second movable mirror directing said flux of incident light reflected from said second fixed mirror to said reflecting means on said movable head assembly; and
a difference between an optical path between said first and second movable reflecting surfaces and a distance between said second movable deflecting surface and said rotating center of said galvanomirror being equivalent to an optical path between said second movable reflecting surface and a focal point of said objective lens on said movable head assembly at a center between said innermost and the outermost peripheries of said disk-shaped medium.

* * * * *